July 19, 1927.
F. E. ERBE
GAS CUT-OFF
Filed Jan. 18, 1927
1,635,986
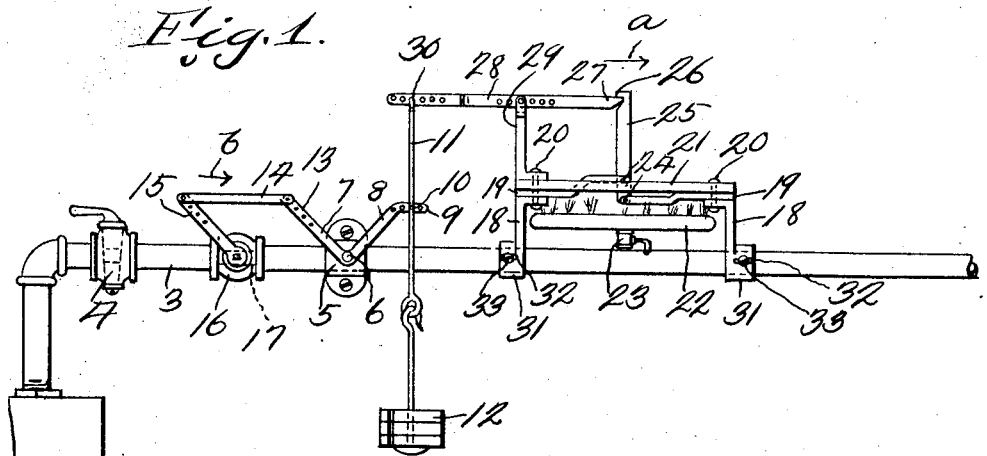
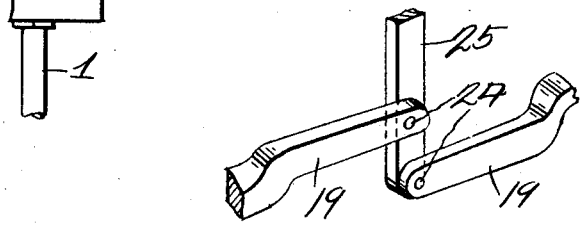
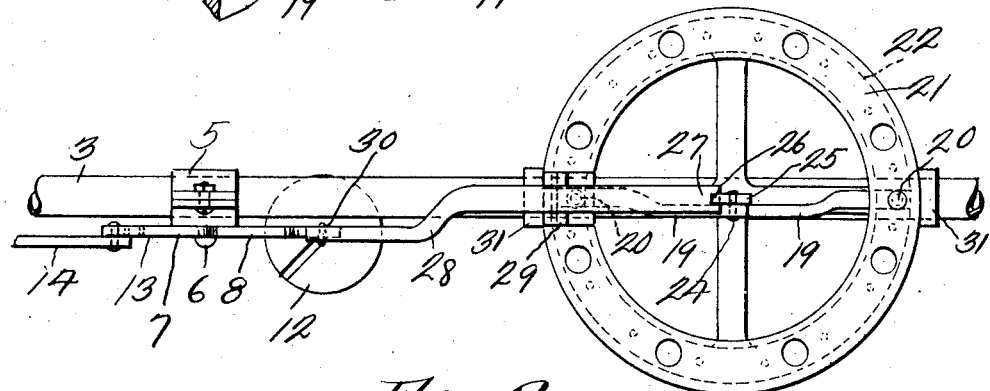
Inventor
Frank E Erbe
By Philip A. Ferrell
Attorney Patented July 19, 1927.

1,635,986

UNITED STATES PATENT OFFICE.

FRANK EDWARD ERBE, OF PONTIAC, MICHIGAN.

GAS CUT-OFF.

Application filed January 18, 1927. Serial No. 161,790.

The invention relates to gas cut offs and has for its object to provide a device of this character thermostatically controlled and carried by a gas supply pipe and forming means whereby upon loss of pressure or flow of gas through the pipe the thermostat will contract and release weight means connected to a valve, and which weight means when released will close the valve and prevent flow of gas through the pipe to any burners which may have been extinguished by the loss of flow, consequently danger of asphyxiation or explosion is obviated.

A further object is to provide upwardly extending brackets carried by the supply pipe, and which brackets are connected to opposite sides of an annular thermostat, which is heated by a burner, an upwardly extending trip lever axially disposed in relation to the thermostat and having connected thereto at spaced points arms, which arms are in turn anchored to opposite sides of the thermostat whereby upon a contraction of the thermostat incident to cooling, the trip lever will be tilted releasing a weight controlled lever for closing the valve.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the device showing the same applied to a gas supply pipe.

Figure 2 is a top plan view of the device.

Figure 3 is a detail perspective view of the lower end of the trip lever and the arms connected thereto.

Referring to the drawing, the numeral 1 designates the supply pipe leading into a house from the street, 2 a meter and 3 the horizontal portion of the supply pipe, which horizonal portion of the supply pipe is provided with the usual cut off valve 4, which is open at all times. It has been found that where gas burners are in use throughout a house that danger of asphyxiation or explosion is caused incident to the cutting of the supply of gas or low pressure from the outside of the house, for instance during repairing of mains, as the lights are extinguished when the gas supply is cut off, consequently when the supply again flows the gas is discharged into the house from the burners. Disposed on the portion 3 of the supply pipe is a clamp 5, to which is pivotally connected at 6 a bell crank lever 7, the arms of which diverge upwardly, and the diverging arm 8 is provided with a horizontal portion 9 to which is connected at 10 a flexible member 11, to the lower end of which is connected a weight 12 for rocking the bell crank lever when the flexible member 11 is allowed to move downwardly. The arm 13 of the bell crank lever has a link connection 14 to the arm 15 of a plug valve 16, the port 17 of which is normally in the dotted line position shown in Figure 1 for allowing passage of gas through the supply pipe to various burners throughout a house. Extending upwardly from the portion 3 of the supply pipe are spaced brackets 18 on the upper ends of which are disposed inwardly extending arms 19, and which arms are also connected by means of the rivets 20 to opposite sides of the annular thermostat 21, whereby during the expansion of the thermostat 21 said arms 19 will move outwardly and upon the cooling and contracting of the thermostat said arms will move inwardly. The thermostat 21 is heated by means of a burner 22 which gets its supply of gas from the pipe 3, and the amount of gas supplied is controlled by a conventional form of valve 23, and it will be seen when the flow of gas is cut off, the burner 22 will be extinguished, consequently the thermostat 21 will cool and contract. The inner ends of the arms 19 are pivotally connected at 24 to the vertically disposed trip lever 25, and at spaced points, therefore it will be seen upon contraction of the annular thermostat 21, the upper end of the lever 25 will be moved in the direction of the arrow *a* whereby the holding lug 26 will move out of overlying engagement with the end 27 of the rock lever 28, which is supported on a bracket 29, consequently the flexible member 11 which is connected at 30 to the rock lever 28 will be allowed to move downwardly under the control of the weight 12, thereby rocking the bell crank lever 7, imparting a pull on the link 14 in the direction of the arrow *b* and moving the plug valve to a closed position, consequently cutting off the flow of gas through the supply pipe until the plug valve 16 is manually moved to open position, the burner 22 lighted and the termostat again heated for holding the trip lever 25 in the position shown in Figure 1. Brackets 18 are preferably carried by sleeves 31, and provided with elongated slots 32 through which screws 33 extend, and which screws and slots allow movement of the bracket towards and away from each other so as not to interfere with the expansion and contraction of the annular thermostat 21, and at the same time the screws prevent rotation of the sleeves on the pipe 3.

From the above it will be seen that a thermostatically controlled automatic cut off valve is provided for gas supply lines, which will be moved to closed position upon the stopping of the flow of gas through the supply pipe, is positive in its operation, and may be easily and quickly applied to a gas supply pipe without materially changing the construction. It will also be seen that the device is simple in construction, the parts reduced to a minimum and can be cheaply manufactured and sold.

The invention having been set forth what is claimed as new and useful is:—

1. The combination with a gas supply pipe, a cut off valve carried by said pipe, of a thermostat control for closing said valve, said thermostat control comprising an annular thermostat above the pipe, brackets carried by the pipe for supporting said thermostat, said brackets being movable towards and away from each other, arms extending inwardly from opposite sides of the thermostat, a vertically disposed trip lever, said last named arms being pivotally connected to the trip lever at spaced points, an upwardly extending bracket carried by one side of the thermostat, a rock lever carried by said last named bracket and having one of its ends disposed in a recess in the trip lever, a weight suspended from the other end of the rock lever, a bell crank lever carried by the pipe, said weight being also suspended from one arm of the bell crank lever, an arm carried by the valve and a link connection between the other end of the bell crank lever and the arm carried by the valve.

2. The combination with a gas supply pipe having a cut off valve, of a thermostat ring adjacent said pipe, means for heating said ring during the flow of gas through the pipe, a vertically disposed trip lever axially disposed in relation to the ring, arms pivoted to the trip lever at spaced points, said arms being anchored to opposite sides of the ring whereby upon contraction of said ring, the arms will be forced together for rocking the trip lever, said trip lever controlling weight controlled mechanism for closing the valve.

In testimony whereof I hereunto affix my signature.

FRANK EDWARD ERBE.